March 11, 1924.

C. H. HAPGOOD 1,486,334

PROCESS AND MACHINE FOR WHIPPING CREAM

Filed Nov. 16, 1922    3 Sheets-Sheet 1

WITNESS:

INVENTOR

Cyrus Howard Hapgood
BY
Frank S. Busser
ATTORNEY.

March 11, 1924.  1,486,334
C. H. HAPGOOD
PROCESS AND MACHINE FOR WHIPPING CREAM
Filed Nov. 16, 1922   3 Sheets-Sheet 2

WITNESS:

INVENTOR
Cyrus Howard Hapgood
BY
Frank S. Busser
ATTORNEY.

March 11, 1924.

C. H. HAPGOOD 1,486,334

PROCESS AND MACHINE FOR WHIPPING CREAM

Filed Nov. 16, 1922   3 Sheets-Sheet 3

WITNESS:
Rob. R. Kitchel

INVENTOR
Cyrus Howard Hapgood
BY
Frank S. Busser
ATTORNEY.

Patented Mar. 11, 1924.

1,486,334

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

PROCESS AND MACHINE FOR WHIPPING CREAM.

Application filed November 16, 1922. Serial No. 601,215.

*To all whom it may concern:*

Be it known that I, CYRUS HOWARD HAPGOOD, a citizen of the United States, residing at Nutley, county of Essex, and State of New Jersey, have invented a new and useful Improvement in Processes and Machines for Whipping Cream, of which the following is a full, clear, and exact description, reference being had to the accompanying drawings, which form a part of this specification.

In whipping cream, as is well understood, the cream undergoes a physical change involving a substantial increase in volume and corresponding decrease in density. If, after this transformation, the whipping operation be continued, the cream "breaks" down into butter. In the manufacture of whipping cream, care must therefore be taken to discontinue the whipping action after conversion into the whipped condition and before "breaking." No difficulty is experienced in arresting the whipping action at the proper stage, when operating on a single batch of cream. This may be successfully accomplished by any skilled domestic or by any manufacturer of pastry or similar articles of food. However, it is often desirable to manufacture whipped cream on a large scale, as in the manufacture of so-called "milk oil," which consists of almost pure butter fat made direct from cream without passage through an intermediate butter-making stage. To whip cream on a large scale involves the adoption of a continuous process. Such a process, to be entirely satisfactory and economical, should be largely or wholly automatic. In any automatic continuous process, the difficulty necessarily arises of subjecting the cream to the degree of whipping required to convert the cream into its whipped condition without at least a partial conversion to butter.

The object of my invention is to provide a process and apparatus for successfully whipping cream automatically in a continuous manner with the assurance that it will reach the whipping stage and not reach the butter conversion stage. I accomplish this by means of the machines shown and described in the accompanying drawings, in which—

Figure 1:
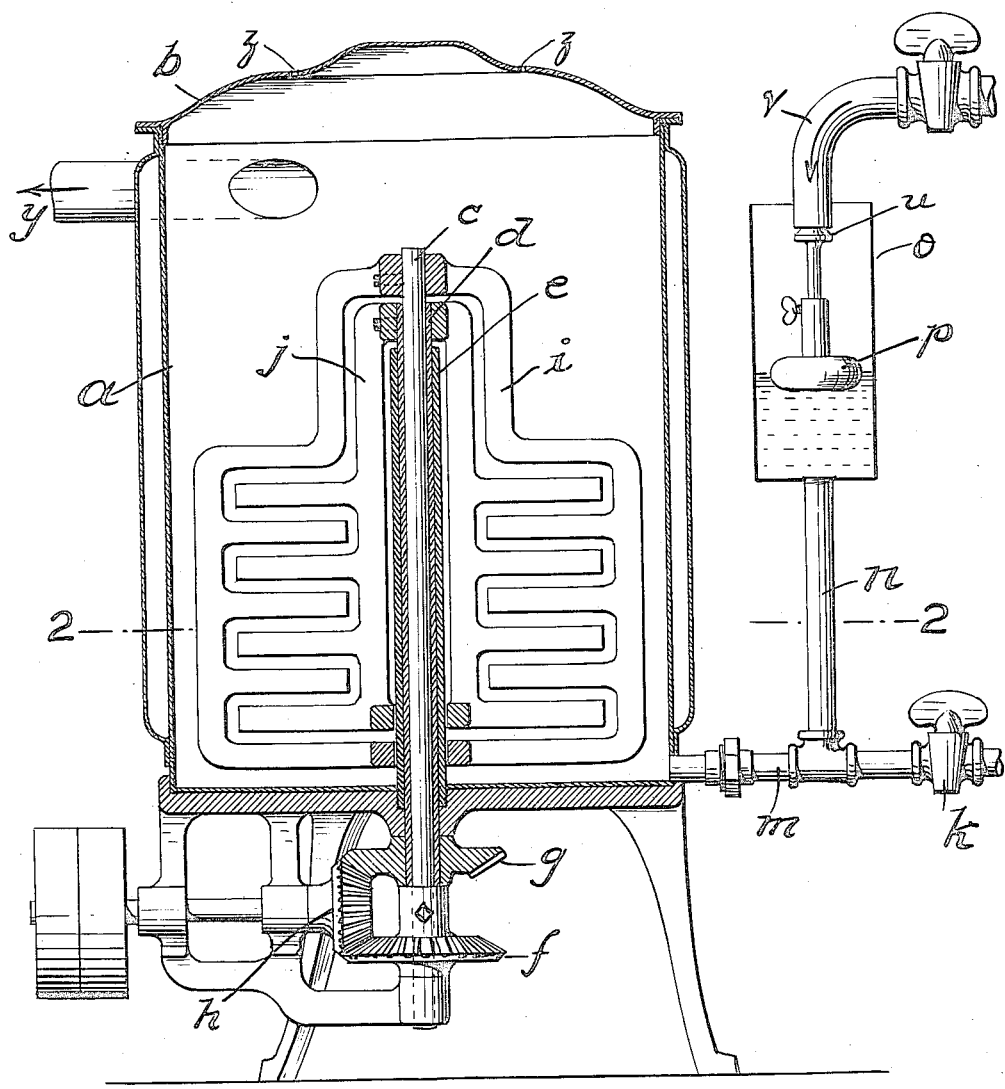
Fig. 1 is a vertical sectional view of the entire machine.

It will be understood that, so far as concerns the construction of my improved cream whipper, the machines illustrated represent several of many different possible embodiments of my invention; and that so far as concerns my process, it is not limited to being carried out in any particular construction of machine.

A container $a$, provided with a removable top $b$, provides a whipping chamber. Extending through the bottom of the chamber is a revoluble shaft $c$ and a revoluble sleeve $d$. Projecting up from the bottom of the container is a stationary exterior bearing or guiding sleeve $e$. The shaft $c$ and sleeve $d$ have secured to them bevel gears $f$ and $g$ respectively, which are engaged by a common driving pinion $h$ and thereby revolved in opposite directions. Secured to the shaft $c$ is a frame $i$ carrying whipping blades and secured to sleeve $d$ is another frame $j$ carrying whipping blades; the two series of whipping blades being arranged alternately so that, as they revolve in opposite directions, adjacent horizontal zones of cream will be subjected to a whipping action in opposite directions.

Any efficient type of beater, whipper or agitator may be substituted for the specific arrangement shown and described.

From the bottom of the whipping chamber projects a horizontal pipe $m$ having on its end a draw-off valve $k$. Projecting upward from pipe $m$ is a pipe $n$ providing an outlet from a cylinder-shaped container forming a float chamber $o$. Within the chamber $o$ is a hollow float $p$. Extending through and projecting upward from the float is a tube $r$. Extending into the upper end of the tube $r$ is a rod or stem $s$, which is adjustably secured within the tube by an adjusting screw $t$. The upper end of the stem $s$ carries a valve $u$ adapted to be retracted from, or seat against, the end of a feed pipe $v$. Depending from the feed pipe is a bracket $w$, in which is threaded a pin

*x*, which functions as a stop to limit the drop of the valve *u*. This stop is intended to operate only to prevent the float dropping to the bottom of the float chamber when the apparatus is not in use, and is threaded in the bracket in order that it can be turned out of operative position to permit the float to be withdrawn for cleaning or other purposes.

In the upper part of the whipping chamber is an outlet pipe *y* for whipped cream. The top of the container may be provided with air vents *z*.

In operation, the level of the cream in the float chamber is held substantially fixed by means of the float *p*. That is, a slight drop in the float, due to the rate of feed from the float chamber *o* exceeding the rate of supply thereto from the feed pipe *v*, increases the area of discharge around the valve *u* and increases the feed of cream to the float chamber. A slight rise in the float, due to the rate of supply to the float chamber exceeding the rate of discharge therefrom, throttles the supply around the valve *n* and decreases the feed of cream to the float chamber. The float is similar, in construction and mode of operation, to floats used to control the feed to a cream separator, and no novelty is claimed for it per se.

In operation cream will flow, at an automatically regulated speed, from the feed pipe *v* through the float chamber *o* to the whipping chamber *a* and be therein subjected to the action of the whipper *i*, *j*. As the cream is whipped, it will be displaced upwardly and forced out through the discharge tube *y*.

The weight of the column of cream in the float chamber and pipe *n* will balance the weight of cream in the whipping chamber *a*. The level of cream in the float chamber will, therefore, be below the level of discharge for cream in the whipping chamber, because the average density of the cream in the whipping chamber (part of which is unwhipped and part whipped) is less than the density of the cream being fed to the whipping chamber. In fact, assuming the density of unwhipped cream to be half that of whipped cream, the level of cream in the float chamber will be midway between the upper and lower levels of the unwhipped cream zone. It is, therefore, necessary to maintain the cream in the float chamber at a predetermined level midway between the upper level and the desired lower level of the unwhipped cream zone. This is done, in the machine described, by so arrangeing the float and valve that when the level of cream in the float chamber rises above its predetermined level, the valve *u* will throttle the feed; while if the level of cream in the float chamber falls below this level, the valve *u* will drop to allow a more rapid feed. In fact, the operation will be to maintain the level of cream in the float chamber approximately constant and thereby maintain the upper level of the zone of unwhipped cream in the whipping chamber approximately constant.

If it is found that the cream is not being sufficiently whipped, it is clear that the condition in the whipping chamber is that more or less unwhipped or imperfectly whipped cream has passed above the level of the whipping blades, that the percentage of whipped cream in the whipping chamber, and the average density of cream in the whipping chamber, are too great. The too dense column of cream in the whipping chamber is, therefore, capable of supporting, and does support, a relatively high column of liquid in the float chamber. By adjusting the float *p* down on the valve stem *s* the predetermined level of cream in the float chamber may be lowered, and it will not be capable of supporting the former weight of cream in the whipping chamber. Hence, as a condition prerequisite to the forcing of cream out of the discharge pipe *y*, the average density of cream in the whipping chamber decreases, the upper level of the unwhipped cream zone drops and the cream is whipped more thoroughly.

If it is found that any part of the cream is being converted into butter, it is clear that this condition can be rectified by an opposite adjustment of the float.

It is clear that the same result may be accomplished by adjusting the height of the column of cream in the whipping chamber, which could be effected by adjusting the height of the discharge *y*.

Figure 2:
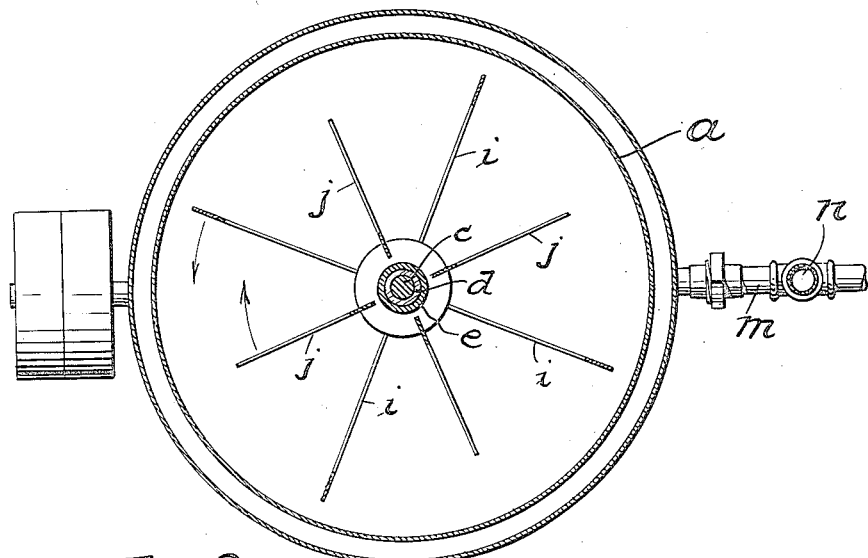
Fig. 2 is a horizontal section on line 2—2 of Fig. 1.
Figure 3:
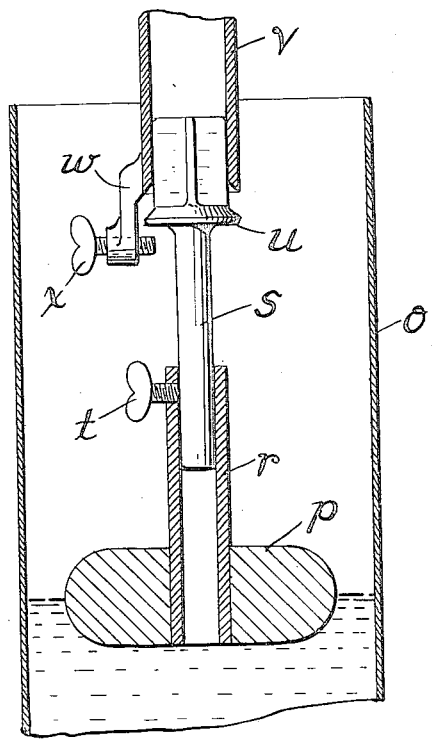
Fig. 3 is a detail view of the float-controlling means.
Figures 4, 5:
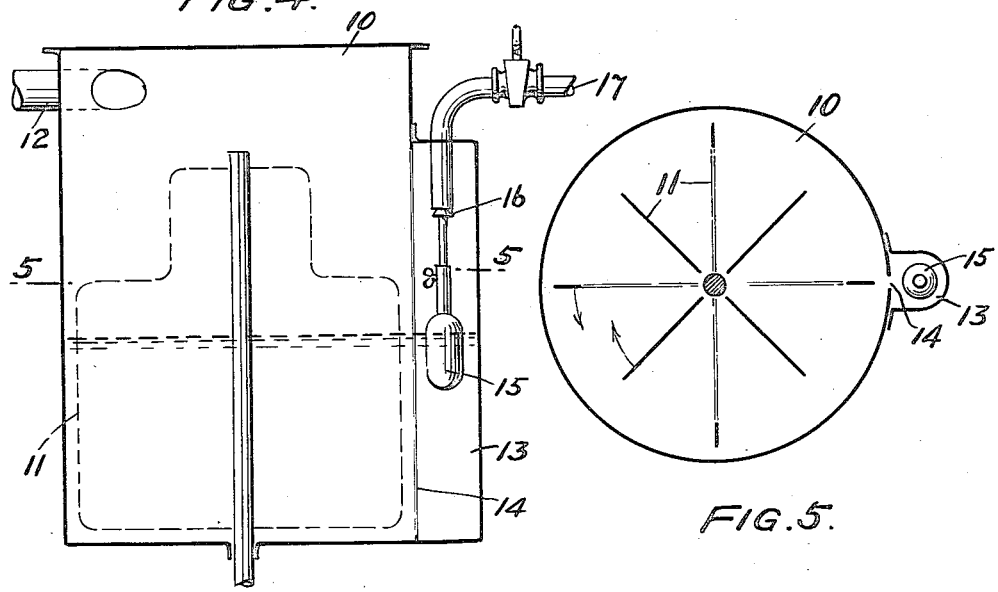
Fig. 4 shows diagrammatically a vertical sectional view of a modified machine.
Fig. 5 is a horizontal section on the line 5—5 of Fig. 4.

A modified apparatus for carrying out the same process is illustrated in Figs. 4 and 5. The container 10 forming the whipping chamber and the whipping mechanism 11 are the same as in the machine of Figs. 1, 2 and 3, and a similar outlet 12 is provided. Alongside the whipping chamber is a float chamber 13, which communicates with the whipping chamber by means of a vertical slot 14, which, if desired, extends up to the top of the float chamber, making the two chambers vertically one. In the float chamber is a float 15, which is of such weight that it will float in the unwhipped cream but sink in the whipped cream.

Therefore its vertical position is determined by the height of the zone of unwhipped cream in the container. Inasmuch as, in this embodiment of the invention, as well as in that shown in Fig. 1, the height of this zone varies with the weight of the whole column of cream in the container, the vertical position of the float 15 may also be said to vary with the weight of the whole column of cream in the container. The float 15 carries a valve 16 controlling the outlet from a feed pipe 17; these parts corresponding to the valve $u$ and feed pipe $v$ of Fig. 3. It is clear that if the zone of unwhipped cream should rise above the whipper, it would be because the rate of feed was too rapid. If this should occur, the float 15 would rise and throttle the feed, so that the feed into the whipping chamber would be less rapid and therefore the cream would be subjected to a whipping operation of longer duration. If, on the other hand, the zone of unwhipped cream should sink so low that the whipper acted too long upon cream already whipped, it would be because the rate of feed was too slow. If this should occur, the float 15 would fall and permit a more rapid feed.

In both embodiments of the invention, the float should be so positioned as to maintain the upper level of unwhipped cream somewhat below the top level of the zone occupied by the whipper. It would be difficult to so arrange the parts that the zone of unwhipped cream would coincide precisely with the top level of the whipping zone. This is unnecessary, because whipped cream can be subjected to a limited additional amount of whipping before it breaks into butter.

Figure 6:
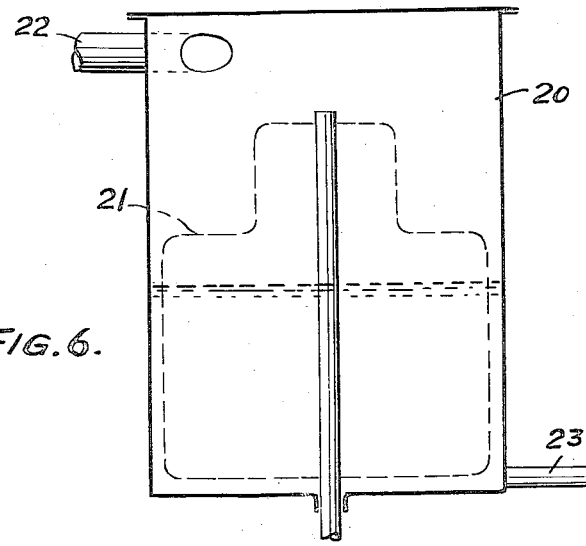
Fig. 6 shows diagrammatically a vertical sectional view of a manually controllable machine.

In Fig. 6 I have illustrated how the whipping process can be controlled manually. The whipping chamber 20, whipper 21, outlet 22, and feed pipe 23 correspond to the elements shown in Fig. 1. On the feed pipe 23 is a manually controlled valve 24. The container wall should be of glass, or at least a vertical strip of the wall should be of transparent material, so that the operator can observe the conditions within the container. It is clear that he can observe at what level the cream is converted into a whipped condition and can adjust the valve 24 so as to provide for the proper rate of feed to insure thorough whipping without breaking into butter. After the proper adjustment is effected, further attention may not be required if the quality and pressure of the inflowing cream be maintained constant.

Having now fully described my invention, what I claim and desire to protect by Letters Patent is:

1. The process of whipping cream, which comprises subjecting the cream to a whipping operation, continuously displacing whipped cream from the whipping zone, feeding additional cream to the whipping zone to replace the same weight of displaced whipped cream, and regulating the rate of feed to insure such displacement after conversion into whipped condition and before breaking into butter.

2. The process of whipping cream, which comprises feeding cream to a container, subjecting the cream to a whipping operation, displacing the cream in whipped condition upwardly out of the whipping zone and discharging it at a higher level, and regulating the rate of feed to insure such displacement after conversion into whipped condition and before breaking into butter.

3. The process of whipping cream, which comprises feeding cream to a container, subjecting the cream to a whipping operation, displacing the cream in whipped condition upwardly out of the whipping zone and discharging it at a higher level, and regulating the rate of feed in accordance with the weight of the column of cream in the container.

4. The process of whipping cream, which comprises feeding cream to a container subjecting the cream to a whipping operation, displacing the cream in whipped condition upwardly out of the whipping zone and discharging it at a higher level, and regulating the rate of feed in accordance with the height of the zone of unwhipped cream in the container.

5. The process of whipping cream, which comprises creating two connected balanced columns of cream, feeding cream to one column, subjecting the cream in the other column to a whipping operation and continuously discharging it, and regulating the degree of whipping by varying the relative levels of liquid of the two columns.

6. The process of whipping cream, which comprises creating two columns of cream connected at their lower ends, subjecting cream in the lower portion of one column to a whipping operation and continuously discharging it from the upper end of the column, feeding cream to the other column, and regulating the level of cream in the latter column so that said level will be sufficiently below the level of cream in the first column to balance the latter when the cream displaced upwardly therein from the whipping zone has been thoroughly whipped without breaking into butter.

7. A continuous cream whipper comprising a whipping chamber having an outlet in its upper portion for the substantially continuous discharge of whipped cream, a cream whipping contrivance extending into the lower part of said chamber, there being a zone for whipped cream above the whipping elements of said contrivance and below the level of said outlet, and means to feed cream to the whipping chamber at a rate that will insure the thorough whipping of the cream and displacement of whipped cream upwardly from the whipping zone without breaking into butter.

8. A continuous cream whipper comprising a whipping chamber having an outlet in its upper portion for the substantially continuous discharge of whipped cream, means in said chamber, substantially below the level of said outlet, to whip the cream, a float also positioned substantially below the level of said outlet, whose level is dependent upon the level of unwhipped cream in the whipping chamber, and a valve controlled by the float and controlling the rate of feed of the cream to the whipping chamber.

9. A continuous cream whipper comprising a whipping chamber having an inlet in its lower portion and an outlet in its upper portion, means in the lower part of said chamber and terminating a substantial distance from the top thereof to whip the cream, and means to feed cream through said inlet to the whipping chamber at a rate that will insure the thorough whipping of the cream and the displacement, from the whipping zone in the lower part of said chamber to the upper part of said chamber below said outlet, of whipped cream without breaking into butter.

10. A continuous cream whipper comprising a whipping chamber having an inlet in its lower portion and an outlet in its upper portion, means in said chamber to whip the cream, means providing a balancing column of cream from which cream to be whipped is supplied to said inlet, and means maintaining the level of cream in said supply column substantially below the level of said outlet and at such height that it will balance the column of cream in the whipping chamber when the average density of the latter is that produced by thorough whipping before emergence from the whipping zone and by emergence therefrom before breaking into butter.

11. A continuous cream whipper comprising a whipping chamber having an inlet in its lower portion and an outlet in its upper portion, means in said chamber to whip the cream, a float chamber connected with said inlet, a cream feed communicating with said float chamber, a float in the chamber, and a feed throttling valve controlled by the float, the float being located substantially below the level of the outlet in the whipping chamber.

In testimony of which invention, I have hereunto set my hand, at New York, on this 30th day of October, 1922.

CYRUS HOWARD HAPGOOD.

Witnesses:
R. R. WARREN,
G. D. TALLMAN.